United States Patent [19]
Hu

[11] Patent Number: 5,171,733
[45] Date of Patent: Dec. 15, 1992

[54] ANTENNA-COUPLED HIGH $T_c$ SUPERCONDUCTING MICROBOLOMETER

[75] Inventor: Qing Hu, Boston, Mass.

[73] Assignee: The Regents of the University of California, Oakland, Calif.

[21] Appl. No.: 625,766

[22] Filed: Dec. 4, 1990

[51] Int. Cl.$^5$ .......................... G01K 7/16; G01J 5/20; G01J 5/08; H01L 39/12
[52] U.S. Cl. ....................................... 505/1; 374/121; 374/176; 250/336.2; 505/847; 505/849
[58] Field of Search ............................... 374/121, 176; 250/336.2; 505/847, 848, 849, 1

[56] References Cited

U.S. PATENT DOCUMENTS

| | | | |
|---|---|---|---|
| 3,742,235 | 6/1973 | Boatner et al. | 250/349 |
| 4,600,840 | 7/1986 | Chutjian | 250/338.5 |

OTHER PUBLICATIONS

Mogro-Campero, A. et al., "Characterization of thin films of Y-Ba-Cu-O on oxidized silicon with a zirconia buffer layer," Appl. Phys. Lett. 52(24) (Jun. 13, 1988).
Neikirk, D. P. et al., "Far-Infrared microbolometer detectors," International Journal of Infrared and Millimeter Waves, vol. 5, No. 3 (1984).
Neikirk, D. P., et al., "Imaging Antenna Arrays," Sixth International Conference on Infrared and Millimeter waves (Dec. 7-12, 1981).
Wu, X. D. et al., "High critical currents in epitaxial YBa$_2$Cu$_3$O$_{7-x}$ thin films on silicon with buffer layers," Appl. Phys. Lett. 54(8) (Feb. 20, 1989).
Jia, Q. X. et al., "Sputter deposition of YBa$_2$Cu$_3$O$_{7-x}$ films on Si at 500° C. with conducting metallic oxide as a buffer layer," Appl. Phys. Lett. 57(3) (Jul. 16, 1990).
Wiener-Avnear, E. et al., "In situ layer deposition of Y$_1$Ba$_2$Cu$_3$O$_{7-x}$ high $T_c$ superconducting thin films with SrTiO$_3$ underlayers," Appl. Phys. Lett. 56(18) (Apr. 30, 1990).
Hwang, et al., "Microbolometers for infrared detection" Appl. Phys. Lett. 34, pp. 773-776, (Jun. 1, 1979).
Hu and Richards, "Design analysis of a High $T_c$ superconducting microbolometer" Appl. Phys. Lett. 55 (23), pp. 2444-2446, (Dec. 4, 1989).
Richards, et al. "Feasibility of the high $T_c$ superconducting bolometer" Appl. Phys. Lett., 54 (3) pp. 283-285 (Jan. 16, 1989).

Primary Examiner—William A. Cuchlinski, Jr.
Assistant Examiner—Diego F. F. Gutierrez
Attorney, Agent, or Firm—Flehr, Hohbach, Test, Albritton & Herbert

[57] ABSTRACT

A device is provided for measuring radiant energy, the device comprising a substrate; a bolometer formed from a high $T_c$ superconducting material disposed on the substrate in an area that is about $1 \times 5$ $\mu m^2$ and about 0.02 $\mu m$ in depth; and a planar antenna disposed on the substrate and coupled to receive radiation and to impart the received radiation to the bolometer.

23 Claims, 2 Drawing Sheets

FIG_1 (PRIOR ART)
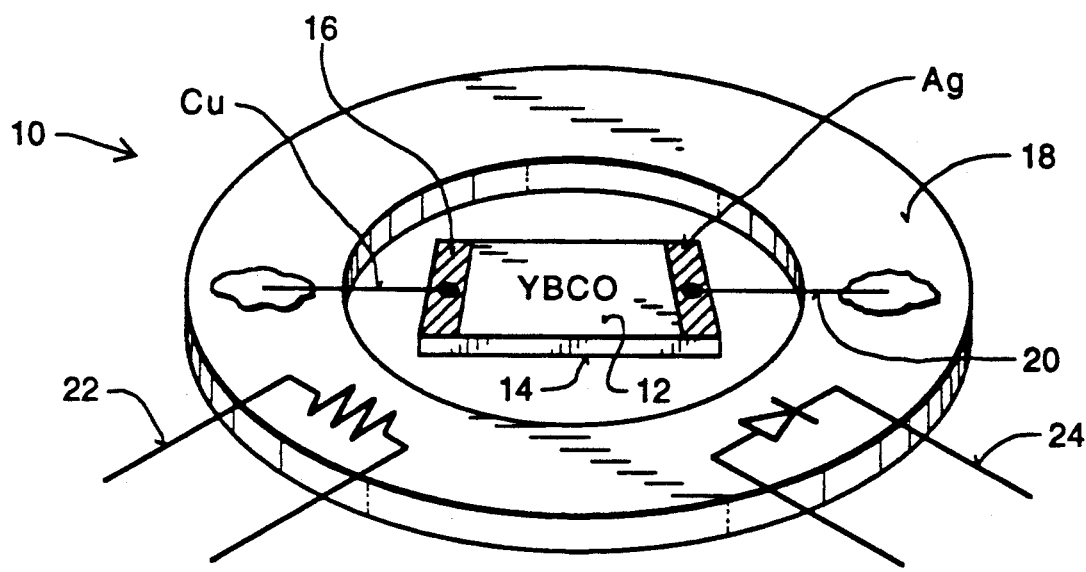
FIG_2
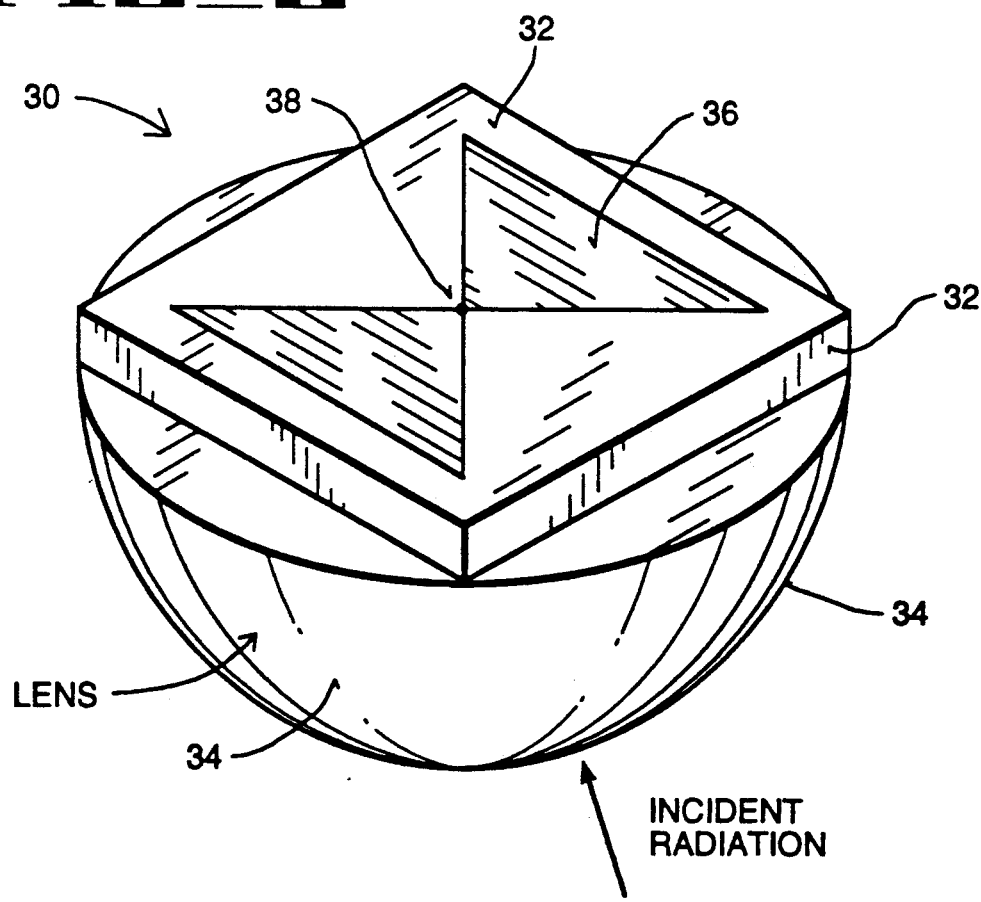

FIG_3A 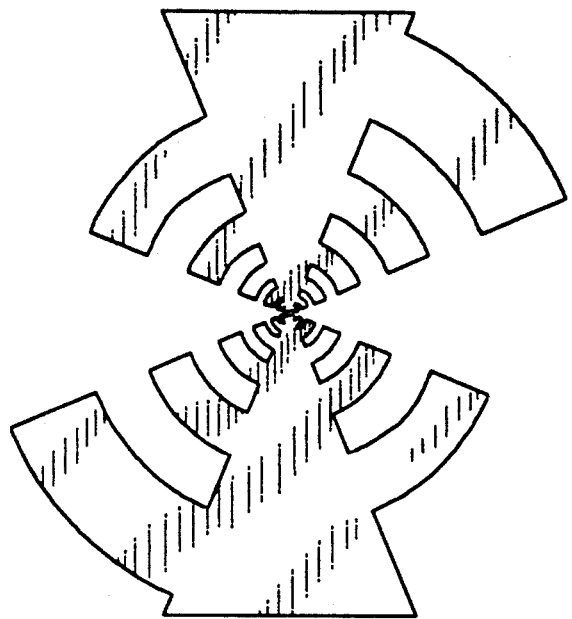 FIG_3B 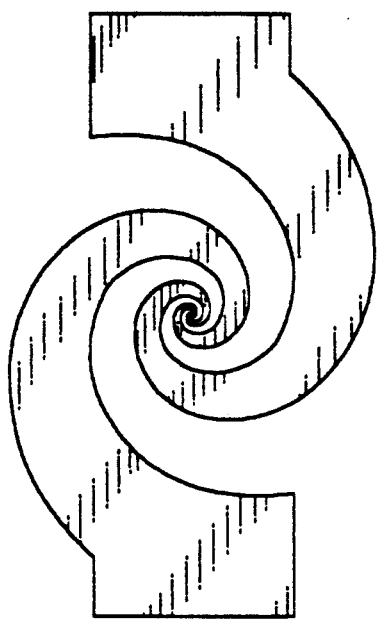
FIG_4 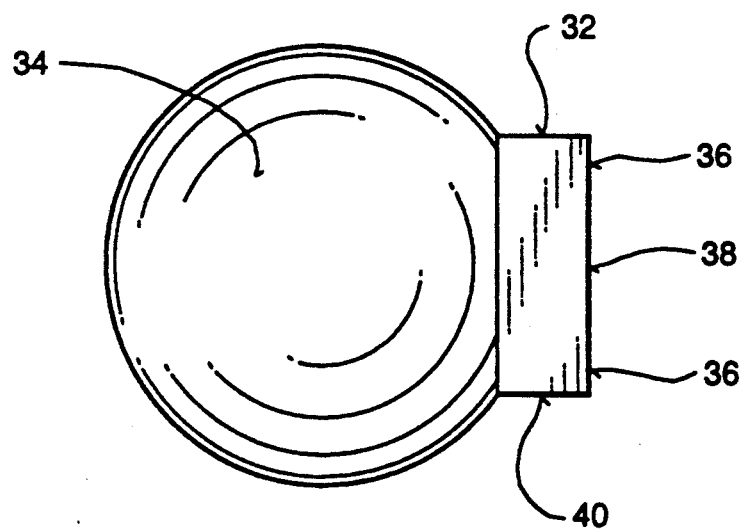

ANTENNA-COUPLED HIGH $T_c$ SUPERCONDUCTING MICROBOLOMETER

BACKGROUND OF THE INVENTION

The work on this invention was performed pursuant to Contract No. DE-AC03-76SF00098 awarded to the University of California, Lawrence Berkeley Laboratory, Berkeley, CA by the U.S. Department of Energy.

1. Field of the Invention

The invention relates generally to bolometers for use in the measurement of radiant energy and, more particularly, to bolometers formed from high $T_c$ superconducting materials.

2. Description of the Related Art

A bolometer is a device which serves as a radiation absorber and an electrical thermometer. As the bolometer absorbs radiation, both its temperature and its electrical resistance change. A measure of the radiation absorbed by a bolometer can be made by measuring changes in its electrical resistance.

The wave nature of the radiant energy absorbed by the bolometer determines minimum bolometer size. In order to directly absorb radiant energy of a particular wavelength, a bolometer generally is sized at least one such wavelength in diameter. However, Hwang, et al, "Microbolometers for infrared detection", *Appl. Phys. Lett.* 34, pp. 773–776, 1979, disclosed an antenna coupled, room-temperature microbolometer formed from bismuth film which is smaller than one wavelength in diameter. Unfortunately, in many applications such earlier antenna coupled microbolometers suffered from relatively poor noise equivalent power (NEP) due to the weak temperature dependence of the resistance of Bi films.

Recently developed high $T_c$ superconducting materials such as $YBa_2Cu_3O_{7-x}$ (YBCO) BiSrCaCuO (BSCCO) and TiBaCaCuO, for example, possess improved NEP. High $T_c$ materials are superconducting at above liquid nitrogen temperatures. $T_c$ is the critical temperature at which the resistance of the material drops to zero. The use of such high $T_c$ materials in bolometers makes possible even more sensitive measurements of radiant energy.

Referring to the illustrative drawing of FIG. 1, there is shown a typical device 10 employing a bolometer 12 formed from YBCO, a high $T_c$ material. The high $T_c$ bolometer 12 is disposed on a substrate formed from $Al_2O_3$. A layer of silver 16 is used to make an electrical contact. The substrate 14 is thermally coupled to an annular heat sink 18 by thermally conductive copper wires 20. A heater 22 regulates the temperature of the heat sink 18 which in operation, for example, can be maintained near the superconducting transition temperature $T_c$. A thermometer 24 monitors the temperature of the heat sink 18.

The sensitivity of the high $T_c$ bolometer 12 depends in part upon its operating temperature. Ordinarily, there is a resistive transition temperature region in which the high $T_c$ bolometer 12 acts as a proportional detector such that changes in bolometer resistance are proportional to the absorbed radiation power. When the bolometer temperature exceeds the resistive transition temperature region the bolometer 12 is said to be in saturation, and its sensitivity to radiant energy drops off. Therefore, it is important to control the operating temperature of the bolometer 12.

One problem of such high $T_c$ bolometers has been the relatively large heat capacity of the substrate 14 which provides mechanical support for the bolometer 12. A large amount of radiant energy is required to heat up a substrate which has a large heat capacity. The sensitivity of the bolometer will therefore be substantially reduced by such undesirably large substrate heat capacity. Thus, there has been a need for a high $T_c$ bolometer in which the substrate is only weakly thermally coupled to the bolometer so that large substrate thermal capacity does not significantly degrade bolometer performance. The present invention meets this need.

SUMMARY OF THE INVENTION

The present invention provides a device for measuring radiant energy which comprises a substrate and a bolometer formed from a high $T_c$ superconducting material disposed on the substrate. An antenna is disposed on the substrate and is coupled to impart received radiation to the bolometer.

The use of a high $T_c$ bolometer advantageously provides a device that is more sensitive to minute changes in radiation. The use of an antenna to impart radiation to the bolometer permits the use of a smaller bolometer which is substantially thermally isolated from the substrate and which, therefore, can be relatively fast.

These and other features and advantages of the present invention will become more apparent from the following description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which:

FIG. 1 is a perspective view representing a conventional device employing a high $T_c$ bolometer;

FIG. 2 is a perspective view representing a device including an antenna-coupled high $T_c$ microbolometer in accordance with the present invention;

FIGS. 3a and 3b, respectively, show a log-periodic antenna and a spiral antenna for use with a device in accordance with the present invention; and FIG. 4 is a side elevation view of the device of FIG. 1.

DETAILED DESCRIPTION OF THE PREFERRED EMBODIMENT

The present invention comprises a novel device, including an antenna-coupled high $T_c$ microbolometer, for measuring radiant energy. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein.

Referring to the illustrative drawings of FIG. 2, there is shown a device 30, in accordance with a presently preferred embodiment of the invention, for measuring radiant energy. The device 30 includes a substrate 32, a lens 34, an antenna 36 and a microbolometer 38 formed from a high $T_c$ superconducting material. The microbolometer has planar dimensions which can be less than one wave length of the measured radiation.

In operation, radiant energy incident upon the lens 34 is focused by the lens onto the antenna 36 which responds to the electric field of the incident radiation. The antenna 36 thereby acts as a current source which imparts energy from the incident radiation to the microbolometer 38 which is coupled to the antenna 36. Variation in the temperature of the microbolometer 38 resulting from the imparted energy provides a measure of the radiant power received by the device 30.

The use of high $T_c$ superconducting material for the microbolometer 38 results in a highly sensitive device 30. In the present embodiment, the high $T_c$ superconducting material is a perscovite oxide material such as $YBa_2Cu_3O_{7-x}$ (abbreviated as YBCO). Alternatively, for example, the high $T_c$ microbolometer could be formed from a different high $T_c$ perscovite type oxide, such as TiBaCaCuO or BiSrCaCuO. The high $T_c$ material can be produced, for example, in single crystal form, in sintered ceramic form, or as a film formed by evaporation or sputtering. A high $T_c$ film can be secured to the substrate 32, for example, by laser ablation or sputtering. The film can be a C-axis film.

The microbolometer 38 is disposed upon the substrate 32 which provides mechanical support for the microbolometer 38 and for the antenna 36. In the present embodiment, the substrate is formed from fused quartz, zirconium oxide, or diamond. Alternatively, the substrate 32 can be formed from Sapphire, magnesium oxide, crystalline quartz, doped Zirconia.

Fused and crystalline quartz are useful substrate materials because of their relatively small dielectric constants and low thermal conductances. A small dielectric constant results in low reflection loss at the dielectric/air boundary. Low thermal conductance results in a high sensitivity. However, fused quartz and crystalline quartz generally are not as favorable as substrates for production of high-quality films because Si tends to diffuse into high $T_c$ films. Further, because of its high dielectric constant, $SrTiO_3$ is not a favorable substrate. More favorable candidates are MgO for a fast microbolometer because of the high thermal conductivity of MgO and $ZrO_2$ stabilized with $Y_2O_3$ for a slower, more sensitive microbolometer. Anti-reflection coatings may be required to reduce reflection losses for high optical efficiency.

The antenna 36 has dimensions that are comparable to the wavelength of the measured radiation so that the antenna can pick up such radiation. The antenna 36 of the presently preferred embodiment is dimensioned for measuring radiant energy in the infrared and submillimeter wavelengths. Qing Hu and P. L. Richards, "Design analysis of a High $T_c$ superconducting microbolometer," Appl. Phys. Lett., 55 (23), pp. 2444–2446, Dec. 4, 1989, which is expressly incorporated herein in its entirety by this reference, provides a detailed description of the theory of operation of the device 30.

The dimensions of the high $T_c$ microbolometer 38 relative to the antenna 36 are quite small. In particular, the area of the microbolometer 38 is several $\mu m^2$. Thus the surface area, A, of the bolometer is less than $\lambda^2$. A microbolometer made with a high $T_c$ superconducting film should have an area of about $1 \times 5$ $\mu m^2$ and a volume of about $1 \times 5 \times 0.002$ $\mu m^3$. We estimate that a $Y_1Ba_2Cu_3O_7$ film applied in these dimensions will exhibit a noise equivalent power approximately 20 times better than conventional films made from bismuth. The small dimensions of the microbolometer 38 result in relatively weak thermal conductance into the bulk of the substrate. As a result, the volume of the substrate 32 thermally coupled to the microbolometer 38 is relatively small such that the microbolometer can operate relatively quickly and can be quite responsive to changes in radiant power incident upon the device 30.

Moreover, thermal isolation of the high $T_c$ microbolometer 38 from the substrate 32 permits the use of a relatively thicker substrate which provides satisfactory mechanical support for the microbolometer, but which, because of the thermal isolation, does not result in degradation of microbolometer performance.

More specifically, the thermal conductance $G_s$ of the high $T_c$ superconducting film to the bulk of the substrate can be written as:

$$G_s(f) = K_s |\int \nabla T \cdot ds| / \Delta T$$

where $K_s$ is thermal conductivity of the substrate, T is the position-dependent temperature in the substrate, $\Delta T$ is the temperature coefficient between the film and the substrate far from the film, and the integral is over the area of the substrate beneath the film. The model of the contact between the film and the substrate is a hemisphere of radius "a", so that the heat flux is radial. The temperature of this contact is assumed to be modulated at frequency f. The area $A = 2\pi a^2$ is said to equal that of the high $T_c$ superconducting material.

The high $T_c$ material essentially acts as a point contact with the substrate 32, and the thermal coupling between the material and the substrate is determined essentially by thermal spreading resistance between the material and the substrate. The relatively low heat capacity of the high $T_c$ material and the relatively small volume of the substrate thermally coupled to it results in a fast microbolometer due to relatively poor thermal coupling between the microbolometer and the substrate.

Additionally, it will be appreciated that a buffer material layer 40 as shown in FIG. 4 can be used between the microbolometer 38 and the substrate 32 in order to further reduce thermal conductance between them. For example, $SrTiO_3$ or $ZrO_2$ could be used as a buffer between a high $T_c$ superconductor material of the microbolometer and the fused quartz substrate.

In the present embodiment, the antenna 36 is a planar, bow-tie type self-complementary antenna. Alternatively, a dipole antenna or another shape self-complementary antenna could be utilized. For example, as shown in FIGS. 3a and 3b, the self-complementary antenna can be of a log-periodic type or a spiral type. An advantage of self-complementary type antennas is that they are quite broad band and have a frequency-independent antenna impedance. In the presently preferred embodiment, the antenna is formed from a metal film.

The dimension of the high $T_c$ film of the present embodiment should be such that its electrical resistance at the mid-point of the microbolometer temperature transition region matches the resistance of the antenna. This impedance matching is important so that the antenna, which serves as a current source, couples energy to the high $T_c$ film rather than reflecting it back into free space. Since typical resistivity of a good-quality YBCO thin film is approximately 100 $\mu\Omega\cdot cm$ just above temperature $T_c$, the ratio of length of the microbolometer to the cross-sectional area of the microbolometer should be approximately $10^6$/cm to match a self-complementary antenna on a substrate with $\epsilon = 10$.

Moreover, the width of the resistive transition region should be narrow so that the voltage responsivity, which is proportional to dR/dT for a constant current bias, will be large. Also, excess (1/f) noise in the microbolometer 38 should be kept small by using high-quality films. Typically, this calls for the use of a high-quality c-axis film.

The heat dissipated in the high $T_c$ material also can be distributed to the substrate by conduction through the metal film antenna 36. This conduction, in principal, can be reduced by forming the antenna from a superconductor material with a higher $T_c$ than the material used for the high $T_c$ microbolometer 38.

As shown in the illustrative drawings of FIG. 4, the substrate 32 is secured to the hyper-hemispherical lens 34. The antenna 36 and microbolometer 38 are formed on a flat side of the substrate opposite the lens. In the preferred embodiment, the lens is formed from single-crystal quartz. The lens is secured to the substrate by a thermal grease such as Apezon ™. The indices of refraction of the lens and the substrate are matched so that the substrate 32 acts as part of the lens.

It will be appreciated that, in operation, a small bias current is provided to the microbolometer 38. The purpose of this current is to allow for measurement of changes in electrical resistance of the microbolometer 38 due to the absorption of radiation. One skilled in the art will appreciate how to couple the microbolometer 38 to conduct such bias current.

Moreover, it will be understood that during operation, the microbolometer 38 is regulated at the thermal transition region, which in the preferred embodiment employing a YBCO film deposited on a fused quartz substrate, ranges between approximately 85° and 95° K. Typically, the device 30 is supercooled using liquid nitrogen, or radiatively cooling in space-based applications, in a manner well known to those skilled in the art, such that the microbolometer 38 is maintained within the thermal transition region.

While one particular embodiment of the invention has been described in detail, it will be appreciated that various modifications can be made to the preferred embodiment without departing from the spirit of the invention. Thus, the invention is not intended to be limited to the preferred embodiment but is described in the claims.

What is claimed is:

1. A device for measuring radiant energy comprising:
   a substrate;
   a bolometer formed from a high $T_c$ superconducting material disposed in an area that is about $1 \times 5$ $\mu m^2$ and about 0.02 $\mu m$ in depth on said substrate; and
   a planar antenna disposed on said substrate and coupled to receive radiation and to impart the received radiation to said bolometer.

2. The device of claim 1, wherein said bolometer has planar dimensions sized relative to dimensions of said substrate such that thermal conductance between said substrate and said bolometer is determined substantially by a thermal spreading resistance between said bolometer and said substrate.

3. The device of claim 1, wherein said high $T_c$ material is a c-axis film.

4. The device of claim 1, wherein said high $T_c$ material is a single crystal material.

5. The device of claim 1, wherein said high $T_c$ material is a sintered ceramic material.

6. The device of claim 1, wherein said bolometer has planar dimensions that are less than one wavelength of the measured radiation.

7. The device of claim 1, wherein said high $T_c$ material is impedance matched with said antenna.

8. The device of claim 1 and further including a lens secured to said substrate.

9. The device of claim 1, wherein said substrate essentially consists of $ZrO_2$ stabilized with $Y_2O_3$.

10. The device of claim 1, wherein said substrate essentially consists of MgO.

11. The device of claim 1 and further including:
    a lens formed from single crystal quartz;
    wherein said substrate essentially consists of fused quartz.

12. The device of claim 1 and further including:
    a hyper-hemispherical lens formed from single crystal quartz;
    wherein said substrate essentially consists of fused quartz.

13. The device of claim 1, wherein said substrate is formed from diamond.

14. The device of claim 1, wherein said substrate is formed from sapphire.

15. The device of claim 1 and further including a buffer material interposed between said high $T_c$ material and said substrate.

16. The device of claim 15, wherein said buffer material reduces thermal conductivity between said high $T_c$ material and said substrate.

17. The device of claim 1 and further including:
    a buffer material interposed between said high $T_c$ material and said substrate;
    wherein said buffer material essentially consists of $SrTiO_3$.

18. The device of claim 1 and further including:
    a buffer material interposed between said high $T_c$ material and said substrate;
    wherein said buffer material essentially consists of $ZrO_2$.

19. The device of claim 1 and further including:
    a lens secured to said substrate;
    wherein said lens and said substrate have substantially matched indices of refraction.

20. The device of claim 1, wherein said antenna is a complementary antenna.

21. The device of claim 1 and further including:
    a lens secured to said substrate;
    wherein said antenna is a complementary antenna.

22. The device of claim 1, wherein said antenna is a dipole antenna.

23. A device for receiving radiation, comprising:
    a substrate;
    a bolometer formed from a high $T_c$ superconducting material disposed in an area that is about $1 \times 5$ $um^2$ and about 0.02 um in depth on said substrate;
    wherein said (bolometer) material has planar dimensions sized relative to dimensions of said substrate such that thermal conductance between said substrate and said (bolometer) material is determined substantially by spreading resistance between said (bolometer) material and said substrate;

wherein said (bolometer) high $T_c$ superconducting material has planar dimensions that are less than one wavelength of the measured radiation;

a planar antenna disposed on said substrate and coupled to impart the measured radiation to said bolometer; and a lens secured to said substrate;

wherein said lens focuses the measured radiation onto said antenna.

* * * * *